(12) United States Patent
Ogasahara

(10) Patent No.: US 8,339,483 B2
(45) Date of Patent: Dec. 25, 2012

(54) IMAGE PROCESSING DEVICE, SOLID-STATE IMAGING DEVICE, AND CAMERA MODULE

(75) Inventor: Takayuki Ogasahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 319 days.

(21) Appl. No.: 12/818,617

(22) Filed: Jun. 18, 2010

(65) Prior Publication Data

US 2011/0043665 A1 Feb. 24, 2011

(30) Foreign Application Priority Data

Aug. 19, 2009 (JP) .................................. 2009-190147

(51) Int. Cl.
*H04N 9/64* (2006.01)
*H04N 7/18* (2006.01)

(52) U.S. Cl. .......................... 348/251; 348/159; 348/335

(58) Field of Classification Search .................. 348/153, 348/159, 241, 251, 335, 340
See application file for complete search history.

(56) References Cited

U.S. PATENT DOCUMENTS

| | | | | |
|---|---|---|---|---|
| 6,538,691 B1* | 3/2003 | Macy et al. | ................. | 348/222.1 |
| 8,248,480 B2* | 8/2012 | Matsunaga et al. | ......... | 348/218.1 |
| 2001/0008418 A1* | 7/2001 | Yamanaka et al. | ............ | 348/222 |
| 2003/0184663 A1* | 10/2003 | Nakano et al. | ................. | 348/241 |
| 2007/0025634 A1* | 2/2007 | Guenter | ......................... | 382/261 |
| 2007/0109399 A1* | 5/2007 | Sekimoto et al. | ............... | 348/36 |
| 2007/0236595 A1* | 10/2007 | Pan et al. | ...................... | 348/335 |
| 2008/0129846 A1* | 6/2008 | Azuma | ......................... | 348/241 |
| 2010/0182484 A1 | 7/2010 | Iijima et al. | | |

FOREIGN PATENT DOCUMENTS

| | | |
|---|---|---|
| JP | 2001-78213 | 3/2001 |
| JP | 2002-158913 | 5/2002 |
| JP | 2002-247593 | 8/2002 |
| JP | 2003-189171 | 7/2003 |
| JP | 2008-11529 | 1/2008 |
| JP | 2009-89082 | 4/2009 |
| JP | 4264464 | 5/2009 |

OTHER PUBLICATIONS

Japanese Office Action issued Jan. 24, 2012, in Patent Application No. 2009-190147 (with English-language translation).
U.S. Appl. No. 13/458,135, filed Apr. 27, 2012, Ogasahara.
U.S. Appl. No. 12/958,781, filed Dec. 2, 2010, Ogasahara.

* cited by examiner

*Primary Examiner* — Hung Lam
(74) *Attorney, Agent, or Firm* — Oblon, Spivak, McClelland, Maier & Neustadt, L.L.P.

(57) ABSTRACT

According to one embodiment, an image processing device includes a shading correcting unit, a distortion correcting unit, a lens-characteristic estimating unit, and a resolution restoring unit. The shading correcting unit, the distortion correcting unit, the lens-characteristic estimating unit, the resolution restoring unit carry out signal processing for each of image data obtained by a plurality of sub-camera modules.

19 Claims, 7 Drawing Sheets

IMAGE PROCESSING DEVICE, SOLID-STATE IMAGING DEVICE, AND CAMERA MODULE

CROSS-REFERENCE TO RELATED APPLICATIONS

This application is based upon and claims the benefit of priority from the prior Japanese Patent Application No. 2009-190147, filed on Aug. 19, 2009; the entire contents of all of which are incorporated herein by reference.

FIELD

Embodiments described herein relate generally to an image processing device, a solid-state imaging device, and a camera module.

BACKGROUND

In a camera module used in a digital camera or the like, according to a demand for a reduction in thickness and a reduction in size, a distance between a lens and an imaging element (a focal length) tends to be reduced as much as possible. In the past, to reduce the distance between the lens and the imaging element, a reduction in size of pixels is advanced. A reduction in the focal length of the lens is performed by, for example, increasing an angle of the lens or using a high refractive-index material. However, as the pixels are further reduced in size, an SN ratio is deteriorated because of insufficiency of sensitivity due to a decrease in a light reception amount per one pixel or because of a decrease in the number of saturated electrons. Further, there is a limit in a reduction in the focal length through selection of a material of the lens and design of the lens.

DETAILED DESCRIPTION

In general, according to one embodiment, an image processing device includes a shading correcting unit, a distortion correcting unit, a lens-characteristic estimating unit, a resolution restoring unit, a block matching unit, and a demosaicing unit. The shading correcting unit carries out shading correction for subject images picked up by imaging elements. The distortion correcting unit corrects distortion of the subject images. The lens-characteristic estimating unit estimates lens characteristics of imaging lenses that capture light made incident on the imaging elements. The resolution restoring unit carries out, based on the estimated lens characteristics, resolution restoration processing for the subject images. The block matching unit carries out block matching processing for alignment of the subject images. The demosaicing unit generates a color image by performing demosaicing processing for image data obtained by the block matching processing. The shading correcting unit, the distortion correcting unit, the lens-characteristic estimating unit, and the resolution restoring unit carry out, on a plurality of sub-camera modules including the imaging elements and the imaging lenses, signal processing for each of image data obtained by the sub-camera modules.

Exemplary embodiments of an image processing device, a solid-state imaging device, and a camera module will be explained below in detail with reference to the accompanying drawings. The present invention is not limited to the following embodiments.

Figure 1:
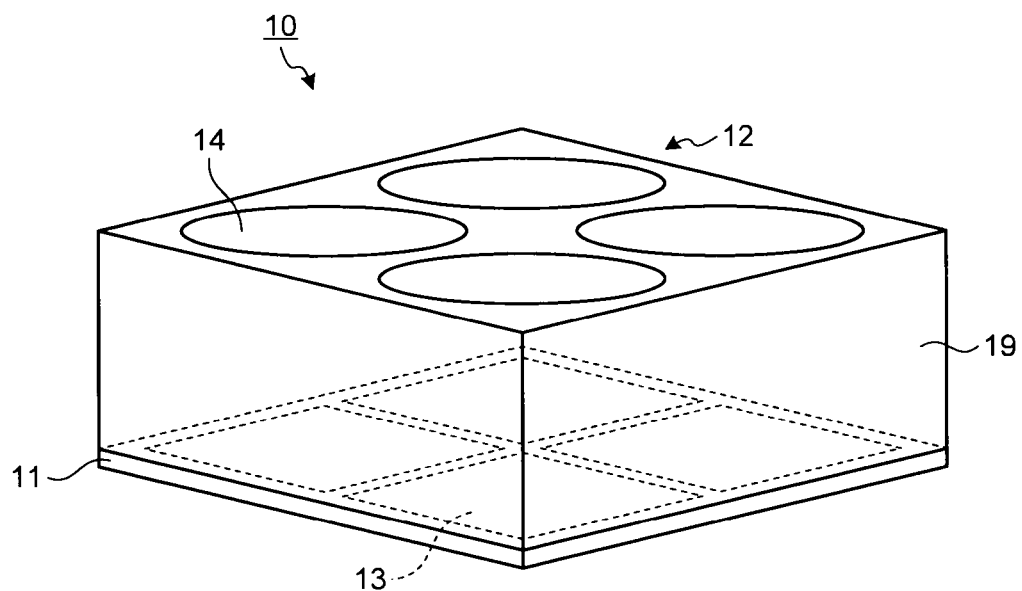
FIG. 1 is a schematic perspective view of a camera module according to a first embodiment.

FIG. 1 is a schematic perspective view of a camera module 10 according to a first embodiment. The camera module 10 includes an image sensor unit 11 and a lenslet 12. The image sensor unit 11 is a solid-state imaging device for picking up a subject image and includes four imaging elements 13. The lenslet 12 includes four imaging lenses 14 arranged on a plane to correspond to the imaging elements 13. A housing 19 of the camera module 10 houses the image sensor unit 11 and the lenslet 12.

The camera module 10 includes four independent sub-camera modules including the imaging elements 13 and the imaging lenses 14. The imaging lenses 14 capture light from a subject and make the light incident on the imaging elements 13. The imaging elements 13 convert the light captured by the imaging lenses 14 into signal charges and pick up subject images.

Figure 2:
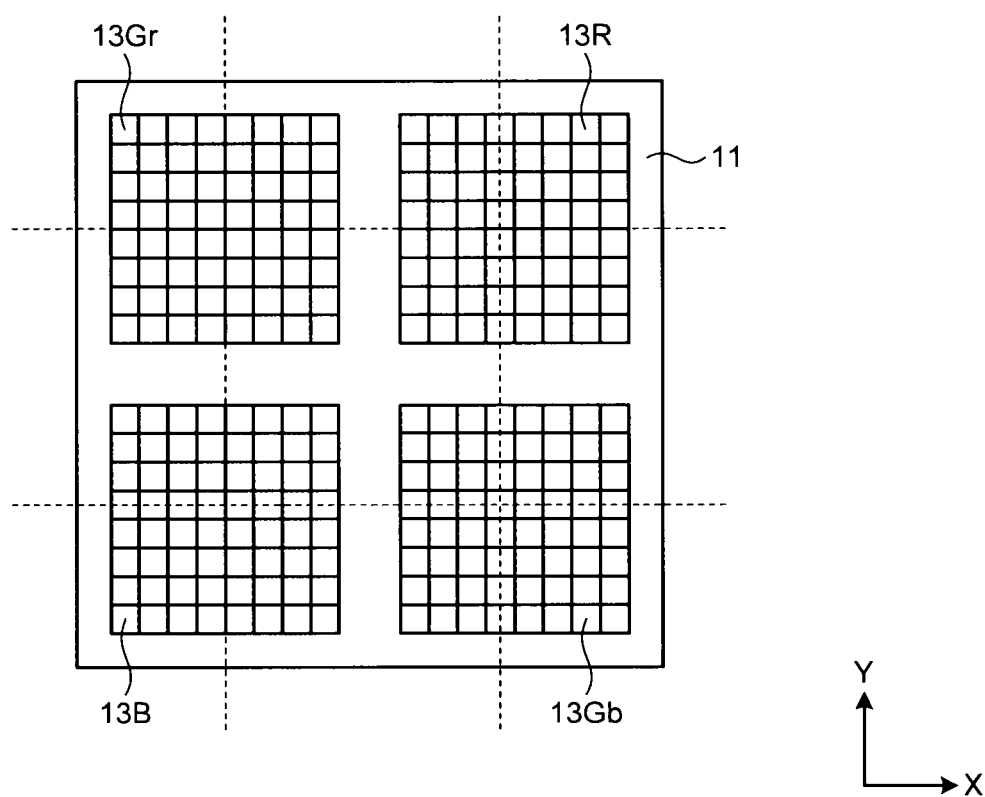
FIG. 2 is a schematic top view of an image sensor unit.

FIG. 2 is a schematic top view of the image sensor unit 11. The four imaging elements 13 (13Gr, 13R, 13B, and 13Gb) are arranged in a 2×2 matrix shape. The imaging element 13R for red (R) light, the imaging element 13B for blue (B) light, and the two imaging elements 13Gr and 13Gb for green (G) light are arranged such that the two imaging elements 13Gr and 13Gb for G light are diagonally opposite to each other as in the Bayer array. A sub-camera module for R includes the imaging element 13R that picks up an R component of a subject image. A sub-camera module for B includes the imaging element 13B that picks up a B component of the subject image. A sub-camera module for Gr includes the imaging element 13Gr that picks up a G component of the subject image. A sub-camera module for Gb includes the imaging element 13Gb that picks up the G component of the subject image.

The camera module 10 adopts a configuration including the lenslet 12 to thereby reduce a focal length of the imaging lens 14. This makes it possible to reduce a distance between the imaging elements 13 and the imaging lenses 14. In the camera module 10, because pixels for the same color components are included in the sub-camera modules, interference of signals for different color components among the adjacent pixels can be prevented. This makes it possible to reduce color mixture and substantially improve sensitivity. In the imaging lenses 14 of the sub-camera modules, lens design can be optimized for the respective color components. This makes it possible to substantially reduce longitudinal chromatic aberration.

The sub-camera module for Gr among the four sub-camera modules is set as a reference sub-camera module. In a plane shown in FIG. 2, a direction in which the imaging element 13Gr of the reference sub-camera module and the imaging element 13R of the sub-camera module for R are arranged in parallel is represented as X direction. A direction in which the imaging element 13Gr of the reference sub-camera module and the imaging element 13B of the sub-camera module for B are arranged in parallel is represented as Y direction. The X direction and the Y direction are perpendicular to each other.

Intersections of broken lines shown in the figure indicate center positions of the imaging elements 13Gr, 13R, 13B, and 13Gb when it is assumed that focusing positions of subject images of the color components coincide with one another. When a focusing position of a subject image picked up by the sub-camera module for Gr is set as a reference, the imaging element 13R of the sub-camera module for R is arranged such that a focusing position of a subject image thereof is shifted by a half pixel in the X direction with respect to the reference. The imaging element 13B of the sub-camera module for B is arranged such that a focusing position of a subject image thereof is shifted by a half pixel in the Y direction with respect to the reference. The imaging element 13Gb of the sub-camera module for Gb is arranged such that a focusing position of a subject image thereof is shifted by a half pixel in the X direction and the Y direction with respect to the reference. Because the sub-camera module for G light is set as the reference sub-camera module and the subject image of the G component having high luminous efficiency is set as the reference, an accuracy difference in image processing explained later can be reduced.

Figure 3:
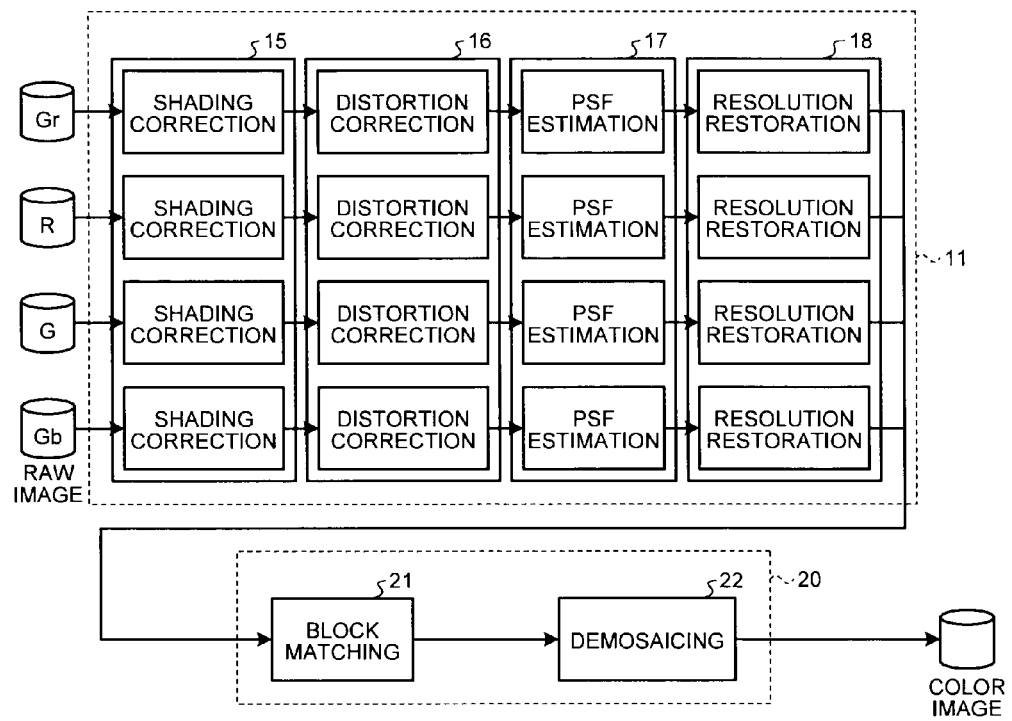
FIG. 3 is a block diagram of a configuration for signal processing in the camera module.

FIG. 3 is a block diagram of a configuration for signal processing in the camera module 10. The configuration for the signal processing is roughly divided into the image sensor unit 11 at a pre-stage and a digital signal processor (DSP) 20 at a post-stage. The DSP 20 is an image processing device that processes image data from the image sensor unit 11. The image sensor unit 11 includes a shading correcting unit 15, a distortion correcting unit 16, a lens-characteristic estimating unit 17, and a resolution restoring unit 18. The shading correcting unit 15, the distortion correcting unit 16, the lens-characteristic estimating unit 17, and the resolution restoring unit 18 carry out the signal processing for each of RAW images of Gr, R, G, and Gb obtained by the four sub-camera modules.

The shading correcting unit 15 corrects luminance unevenness caused by the imaging lenses 14, in particular, a light amount difference between the center and the periphery of a subject image (shading correction). The distortion correcting unit 16 corrects distortion of the subject image caused by the imaging lenses 14. The lens-characteristic estimating unit 17 estimates lens characteristics of the imaging lenses 14 such as magnification chromatic aberration and a blur amount that are causes of color blurring of a contour. As the lens characteristics, for example, a point spread function (PSF) as an optical transfer coefficient is used. The lens-characteristic estimating unit 17 estimates the PSF according to, for example, the method of least squares.

The resolution restoring unit 18 carries out resolution restoration processing based on the lens characteristics estimated by the lens-characteristic estimating unit 17. An effect of resolution restoration depends on an algorithm used for restoration. In the resolution restoration processing, for example, the Richardson-Lucy method is used to restore an image close to an original subject image.

The DSP 20 includes a block matching unit 21 and a demosaicing unit 22. The block matching unit 21 carries out block matching (pattern matching) processing on the RAW images of Gr, R, B, and Gb subjected to the processing by the shading correcting unit 15, the distortion correcting unit 16, the lens-characteristic estimating unit 17, and the resolution restoring unit 18. The block matching unit 21 aligns, by performing the block matching processing, subject images obtained by the sub-camera modules.

Figure 4:
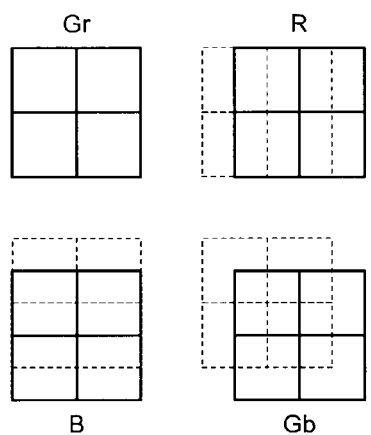
FIG. 4 is a diagram for explaining alignment of subject images by a block matching unit.

FIG. 4 is a diagram for explaining the alignment of the subject images by the block matching unit 21. All squares shown in the figure represent pixels. Concerning an R pixel, a B pixel, and a Gb pixel, a state in which focusing positions of subject images coincide with one another is represented by a broken line and a state in which the pixels are shifted with respect to a Gr pixel is represented by a solid line. The R pixel is shifted by a half pixel in a lateral direction in the figure with respect to the Gr pixel. The B pixel is shifted by a half pixel in a longitudinal direction in the figure with respect to the Gr pixel. The Gb pixel is shifted by a half pixel in the lateral direction and the longitudinal direction with respect to the Gr pixel. The block matching unit 21 performs, based on the position of the Gr pixel, alignment in sub-pixel units such that the R pixel, the B pixel, and the Gb pixel are shifted by a half pixel in predetermined directions. Consequently, the block matching unit 21 carries out block matching processing for obtaining a predetermined total number of pixels.

Referring back to FIG. 3, the demosaicing unit 22 generates a color image by performing demosaicing processing for an image obtained by the block matching processing. The demosaicing unit 22 generates a signal value of an insufficient color component by applying pixel interpolation processing to the image obtained by the block matching processing assuming that the image is formed in the Bayer array. In this embodiment, the subject images picked up by the sub-camera modules are shifted to generate a color image, whereby the predetermined total number of pixels is obtained. The camera module 10 outputs the color image generated in this way. The procedure of the processing explained in this embodiment is only an example. Addition of other processing, a change of order of the processing, and the like can be performed as appropriate.

The camera module 10 according to this embodiment can perform photographing at high sensitivity by reducing color mixture and carrying out the signal processing for each of the RAW images. Consequently, the camera module 10 can realize a reduction in thickness and a reduction in size and the photographing at high sensitivity. The camera module 10 is configured to carry out RAW image processing in the image sensor unit 11 and carry out RGB synchronization (demosaicing) processing in the DSP 20. Therefore, most of processing by the camera module in the past can be diverted and changes of a system can be reduced. In the camera module 10, the system in the past can be diverted concerning, for example, processing other than the block matching processing.

In the camera module 10, sub-camera modules including, for example, low-sensitivity pixels and high-sensitivity pixels for G light, pixels including complementary color filters for colors other than RGB, and pixels including white/gray filters can be provided instead of the sub-camera modules for Gr and Gb according to a purpose or an application.

The camera module 10 does not always shift subject images according to the arrangement of the sub-camera modules. The camera module 10 can shift the subject images by, for example, adding position information concerning the shift of the subject images to the lens characteristics estimated by the lens-characteristic estimating unit 17. Position information for shifting the subject images picked up by the sub-camera modules other than the reference sub-camera module with respect to the subject images picked up by the reference sub-camera module is added to the lens characteristics. The resolution restoring unit 18 restores resolution based on the lens characteristics added with such position information. In this way, the camera module 10 shifts the subject images by performing the signal processing. Such a method is useful, for example, when it is difficult to physically control a shift amount of a subject because influence of an attachment error of an imaging element or fluctuation in manufacturing is large. The method is suitable for reducing the size of the imaging elements.

The camera module 10 is not limited to a camera module that obtains the predetermined total number of pixels by shifting subject images in sub-pixel units. For example, the camera module 10 can obtain the predetermined total number of pixels through up-sampling in the demosaicing unit 22. The up-sampling is useful when alignment in sub-pixel units is difficult in the block matching unit 21. When the up-sampling in the demosaicing unit 22 is adopted, the camera module 10 can also obtain high sensitivity.

Figure 5:
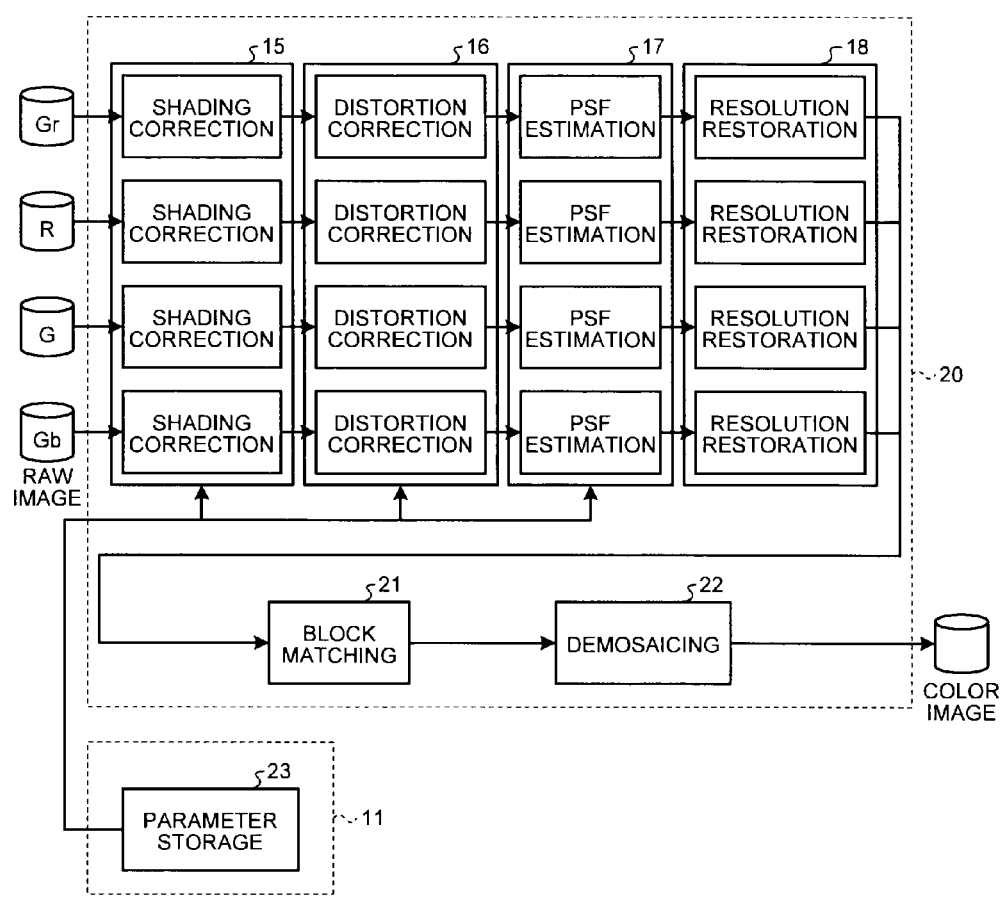
FIG. 5 is a block diagram of a modification of the configuration for the signal processing in the camera module.

FIG. 5 is a block diagram of a modification of a configuration for the signal processing in the camera module 10. In this modification, the camera module 10 carries out the signal processing from the shading correction to the demosaicing processing in the DSP 20. The DSP 20 includes the shading correcting unit 15, the distortion correcting unit 16, the lens-characteristic estimating unit 17, the resolution restoring unit 18, the block matching unit 21, and the demosaicing unit 22. The image sensor unit 11 includes a parameter storing unit 23. Parameters necessary for the processing in the DSP 20 are written in the parameter storing unit 23. The parameter storing unit 23 stores the written parameters. The image sensor unit 11 stores individual information of the camera module 10 in the parameter storing unit 23 as parameters. The individual information is information concerning an individual difference of each product, for example, a manufacturing error of a component such as a lens and an assembly error among components.

The shading correcting unit 15 carries out the shading correction for a subject image referring to the parameters stored in the parameter storing unit 23. The distortion correcting unit 16 corrects distortion of the subject image referring to the parameters stored in the parameter storing unit 23. The lens-characteristic estimating unit 17 estimates the lens characteristics of the imaging lenses 14 of the sub-camera modules referring to the parameters stored in the parameter storing unit 23. In the camera module 10, at least one of the shading correcting unit 15, the distortion correcting unit 16, and the lens-characteristic estimating unit 17 only has to refer to the parameters stored in the parameter storing unit 23.

In the case of this modification, as in the embodiment, the camera module 10 can realize a reduction in thickness and a reduction in size and the photographing at high sensitivity. In general, in the DSP 20, limitation on a circuit size is often small compared with the image sensor unit 11. Therefore, the camera module 10 is configured to carry out the RAW image processing and the RGB synchronization (demosaicing) processing in the DSP 20. This makes it possible to obtain a high-quality image by performing complicated and advanced signal processing. Further, in the case of this modification, in the camera module 10, the circuit size of the image sensor unit 11 can be reduced.

The camera module 10 can carry out, with the image sensor unit 11, the signal processing from the shading correction to the demosaicing processing. In this case, the image sensor unit 11 includes the shading correcting unit 15, the distortion correcting unit 16, the lens-characteristic estimating unit 17, the resolution restoring unit 18, the block matching unit 21, and the demosaicing unit 22 (not shown in the figure). The camera module 10 is configured to carry out the RAW image processing and the RGB synchronization (demosaicing) processing in the image sensor unit 11. This makes it possible to increase speed of the signal processing with a simple circuit configuration. The DSP 20 is not always provided on the inside of the camera module 10 and can be provided on the outside of the camera module 10.

Figure 6:
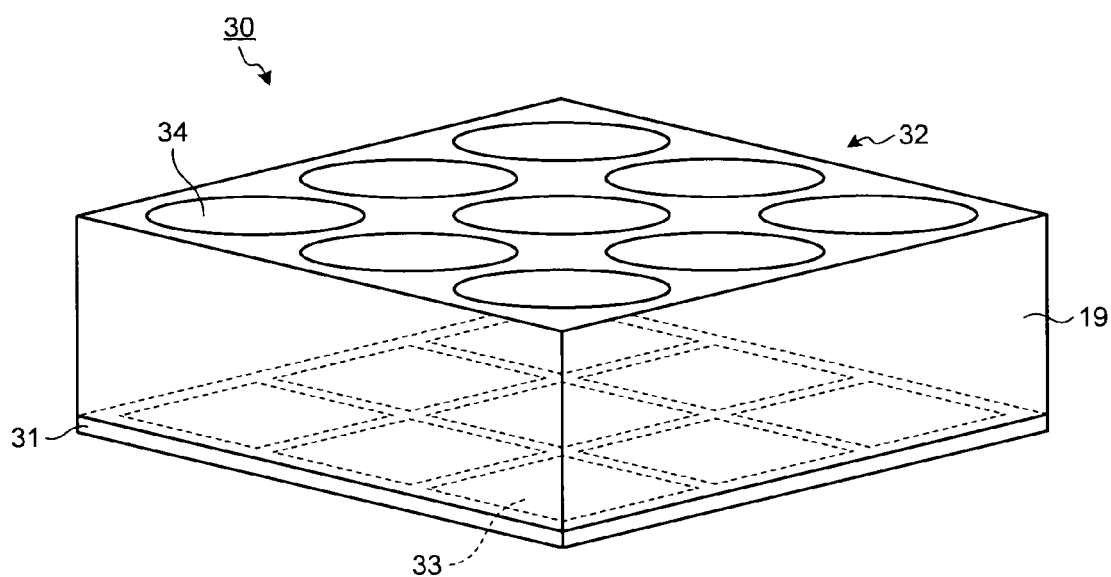
FIG. 6 is a schematic perspective view of a camera module according to a second embodiment.

FIG. 6 is a schematic perspective view of a camera module 30 according to a second embodiment. The camera module 30 according to this embodiment includes nine independent sub-camera modules including imaging elements 33 and imaging lenses 34. An image sensor unit 31 as a solid-state imaging device includes nine imaging elements 33. A lenslet 32 includes nine imaging lenses 34 arranged on a plane to correspond to the imaging elements 33. A housing 19 of the camera module 30 houses the image sensor unit 31 and the lenslet 32.

Figure 7:
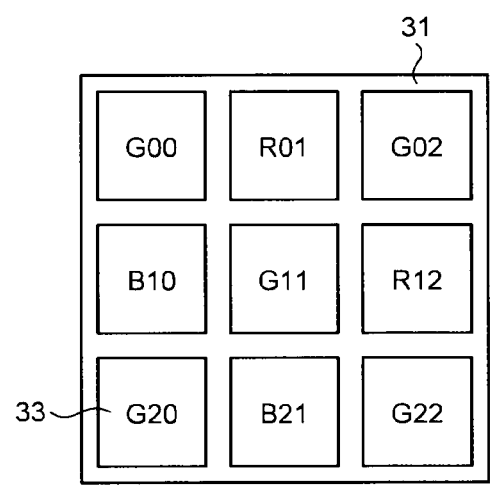
FIG. 7 is a schematic top view of an image sensor unit.

FIG. 7 is a schematic top view of the image sensor unit 31. The nine imaging elements 33 are arranged in a 3×3 matrix shape. Among the nine imaging elements 33, two imaging elements 33 are imaging elements for R light (R01 and R12), two imaging elements 33 are imaging elements for B light (B10 and B21), and five imaging elements are imaging elements for G light (G00, G02, G11, G20, and G22). One imaging element 33 (G11) among the five imaging elements 33 for G light is arranged in the center of the matrix. Four imaging elements 33 (G00, G02, G20, and G22) are arranged to be diagonally opposed around the imaging element G11. The imaging elements 33 for R light (R01 and R12) and the imaging elements 33 for B light (B10 and B21) are arranged to be longitudinally and laterally adjacent to the imaging elements 33 for G light.

Like the camera module 10 according to the first embodiment, in the camera module 30 according to this embodiment, a reduction in a distance between the imaging elements 33 and the imaging lenses 34, improvement of sensitivity through a reduction in color mixture, and a reduction in longitudinal chromatic aberration are possible. A sub-camera module for G (G11) arranged in the center among the nine sub-camera modules is set as a reference sub-camera module. Because the sub-camera module for G light is set as the reference sub-camera module and a subject image of a G component having high luminous efficiency is set as a reference, an accuracy difference in image processing explained later can be reduced.

Figure 8:
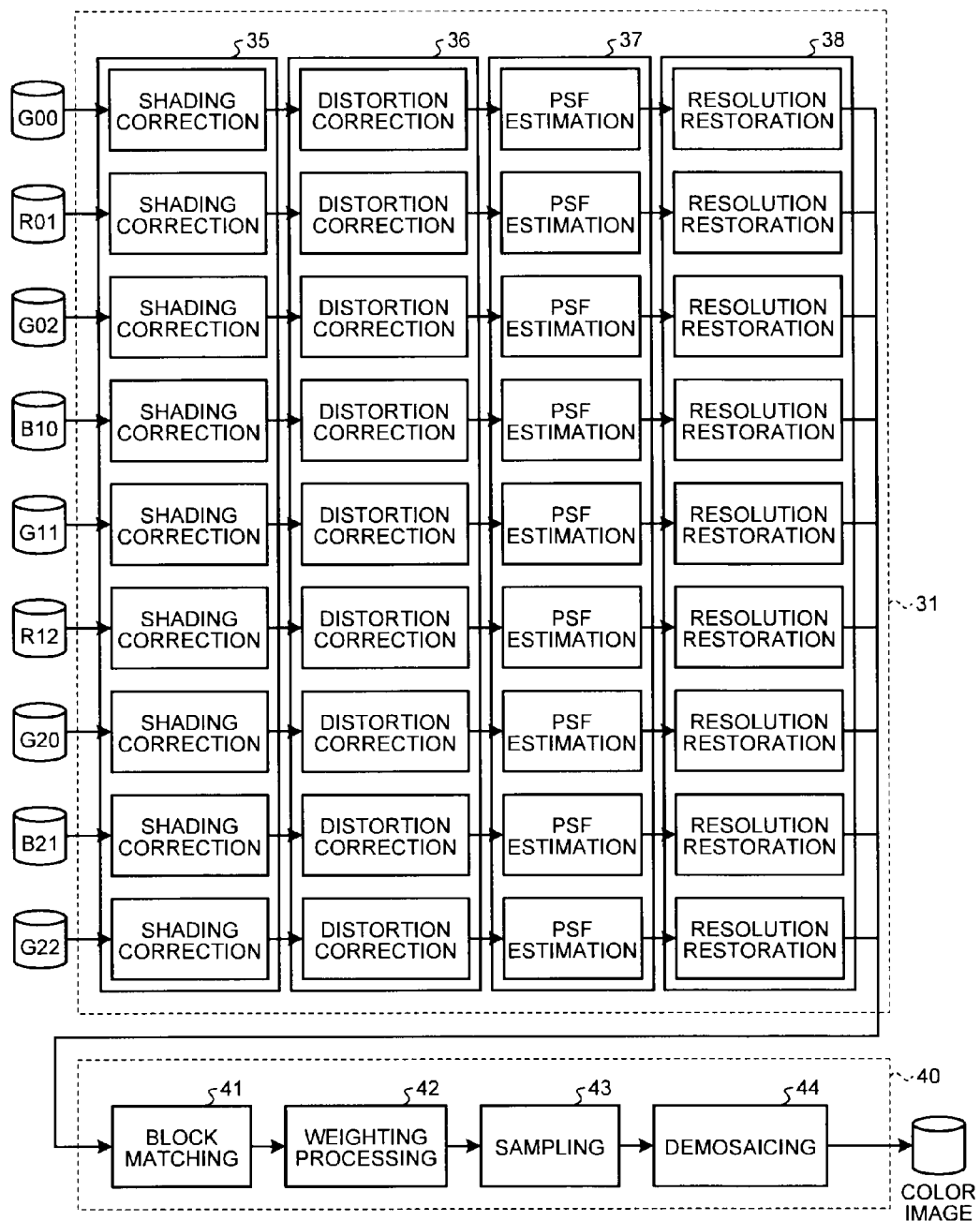
FIG. 8 is a block diagram of a configuration for signal processing in the camera module.

FIG. 8 is a block diagram of a configuration for signal processing in the camera module 30. The configuration for the signal processing is roughly divided into the image sensor unit 31 at a pre-stage and a DSP 40 at a post-stage. The DSP 40 is an image processing device that processes image data from the image sensor unit 31. The image sensor unit 31 includes a shading correcting unit 35, a distortion correcting unit 36, a lens-characteristic estimating unit 37, and a resolution restoring unit 38. In the image sensor unit 31, the shading correcting unit 35, the distortion correcting unit 36, the lens-characteristic estimating unit 37, and the resolution restoring unit 38 carry out the signal processing for each of RAW images obtained by the nine sub-camera modules (G00, R01, G02, B10, G11, R12, G20, B21, and G22).

The shading correcting unit 35 corrects luminance unevenness caused by the imaging lenses 34, in particular, a light amount difference between the center and the periphery of a subject image (shading correction). The distortion correcting unit 36 corrects distortion of the subject image caused by the imaging lenses 34. The lens-characteristic estimating unit 37 estimates lens characteristics of the imaging lenses 34 such as magnification chromatic aberration and a blur amount that are causes of color blurring of a contour. As the lens characteristics, for example, a point spread function (PSF) as an optical transfer coefficient is used. The lens-characteristic estimating unit 37 estimates the PSF according to, for example, the method of least squares.

The resolution restoring unit 38 carries out resolution restoration processing based on the lens characteristics estimated by the lens-characteristic estimating unit 37. An effect of resolution restoration depends on an algorithm used for restoration. In the resolution restoration processing, for example, the Richardson-Lucy method is used to restore an image close to an original subject image.

The DSP 40 includes a block matching unit 41, a weighting processing unit 42, a sampling unit 43, and a demosaicing unit 44. The block matching unit 41 carries out block matching (pattern matching) processing on the RAW images subjected to the processing by the shading correcting unit 35, the distortion correcting unit 36, the lens-characteristic estimating unit 37, and the resolution restoring unit 38. The block matching unit 41 aligns, by performing the block matching processing, subject images obtained by the sub-camera modules. The weighting processing unit 42 calculates a parallax amount in the subject images obtained by the sub-camera modules and carries out weighting processing corresponding to the parallax amount to thereby correct parallax.

Figure 9A:
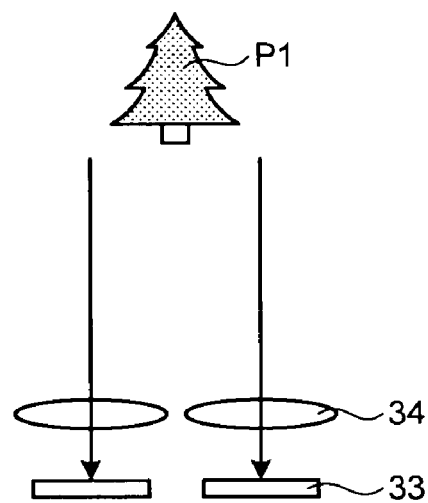
FIGS. 9A to 9C are diagrams for explaining parallax of subject images.
Figure 9B:
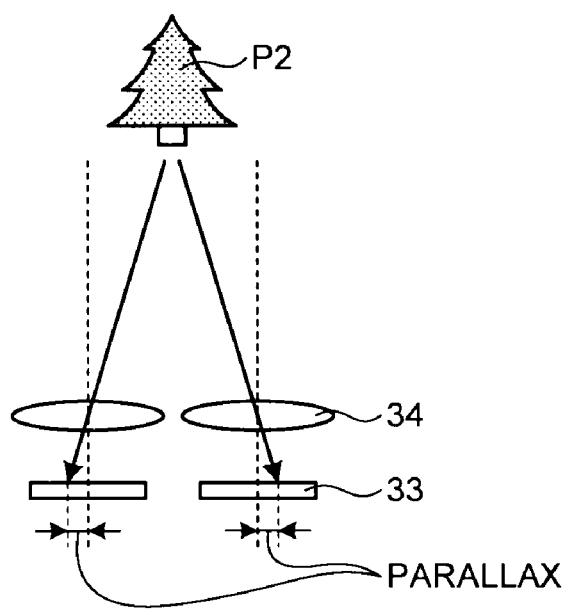
Figure 9C:
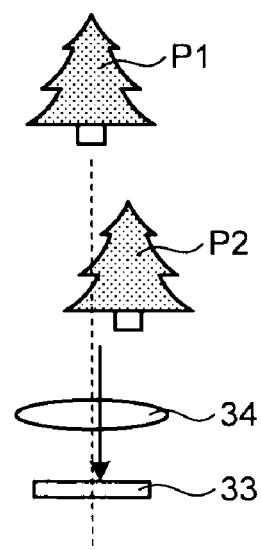

FIGS. 9A to 9C are diagrams for explaining parallax of a subject image. In FIG. 9A, a subject P1 is present at the infinity. In this case, no parallax occurs in the subject images obtained by the sub-camera modules. In FIG. 9B, a subject P2 is present at a close-range distance. Parallax is a phenomenon in which focusing positions are different at the close-range distance. When parallax occurs, if a color image is generated without taking into account the parallax, an image is blurred and image quality is spoiled. Subject images obtained by the eight sub-camera modules around the reference sub-camera module among the nine sub-camera modules are affected by the parallax.

On the other hand, in the case of the reference camera module located in the center of the nine sub-camera modules, as shown in FIG. 9C, when the subject P1 is present at the infinity and the subject P2 is present at the close-range distance, assuming that parallax does not occur in the subject images, the weighting processing unit 42 calculates a parallax amount based on difference information between a subject image picked up by the reference sub-camera module not affected by parallax and subject images picked up by the other sub-camera modules. As the difference information, for example, a luminance difference and edge information are applied. The weighting processing unit 42 calculates difference information in sub-pixel units between the diagonally-arranged sub-camera modules (G00, G02, G20, and G22) shown in FIG. 7 and the reference sub-camera module (G11). Output resolution is higher as the difference information is calculated at a finer sub-pixel level. The weighting processing unit 42 increases weighting on a signal value of the reference sub-camera module (G11) assuming that a parallax amount is larger as a calculated difference value is larger. On the other hand, concerning the R light, because luminous efficiency is not as high as that of the G light, the weighting processing unit 42 performs weighting based on weighting information of one sub-camera module (G02) and the reference sub-camera module (G11). Concerning the B light, as in the case of the R light, the weighting processing unit 42 performs weighting based on weighting information of one sub-camera module (G20) and the reference sub-camera module (G11).

In the camera module 30, a coordinate conversion processing unit (not shown in the figure) that reduces a parallax amount (a movement amount) by performing coordinate conversion processing employing a matrix such as Affine transform can be applied instead of the weighting processing unit 42. The coordinate conversion processing means a processing for calculating, based on position information of a pixel photographed by the reference sub-camera module and position information of pixels photographed by the other sub-camera modules, a coordinate conversion matrix through a method such as the method of least squares. In this embodiment, the nine sub-camera modules are used. However, when four sub-camera modules are used, it is desirable to calculate a parallax amount with the imaging element for G light set as a reference.

Referring back to FIG. 8, the sampling unit 43 carries out, with a subject image picked up by the reference sub-camera module set as a reference, sampling of a signal value concerning an image, parallax of which is corrected, and obtains a predetermined total number of pixels. The sampling unit 43 carries out, based on an image generated in sub-pixel units by the weighting processing unit 42, sampling for obtaining a signal value in pixel units. As method of sampling, for example, an interpolation method such as a bilinear or bicubic method is applied. When the coordinate conversion processing unit is applied instead of the weighting processing unit 42, the sampling unit 43 carries out sampling based on an image generated by the coordinate conversion processing unit. The demosaicing unit 44 generates a color image by performing demosaicing processing for an image obtained by the sampling in the sampling unit 43. The camera module 30 outputs the color image generated in this way. A procedure of the processing explained in this embodiment is only an example. Addition of other processing, a change of the procedure of the processing, and the like can be performed as appropriate.

In this embodiment, as in the first embodiment, the camera module 30 can realize a reduction in thickness and a reduction in size and photographing at high sensitivity. The camera module 30 is configured to carry out RAW image processing in the image sensor unit 31 and carry out RGB synchronization (demosaicing) processing in the DSP 40. Therefore, most of processing by the camera module in the past can be diverted and changes of a system can be reduced. In the camera module 30, the system in the past can be diverted concerning, for example, processing other than the block matching processing.

The arrangement of the sub-camera modules is not limited to that shown in FIG. 7. For example, the arrangement of the sub-camera module for R and the sub-camera module for B can be changed as appropriate. As the reference sub-camera module, a sub-camera module in which RGB pixels are arranged in the Bayer array can be used instead of the sub-camera module for G. In this case, a focal length of the sub-camera module in which the RGB pixels are arranged in the Bayer array is long. Therefore, in the camera module 30, it is desirable to use wide-angle lenses as the imaging lenses 34 to equalize the focal length with a focal length of the other sub-camera modules. Further, in the camera module 30, sub-camera modules including, for example, low-sensitivity pixels and high-sensitivity pixels, pixels including complementary color filters for colors other than RGB, and pixels including white/gray filters can be provided according to a purpose or an application.

The camera module 30 does not always obtain the predetermined total number of pixels through the image generation in sub-pixel units in the weighting processing unit 42. Even when accuracy in sub-pixel units cannot be obtained, for example, the camera module 30 can obtain the predetermined total number of pixels through up-sampling in the demosaicing unit 44. When the up-sampling in the demosaicing unit 44 is adopted, the camera module 30 can also obtain high sensitivity.

Figure 10:
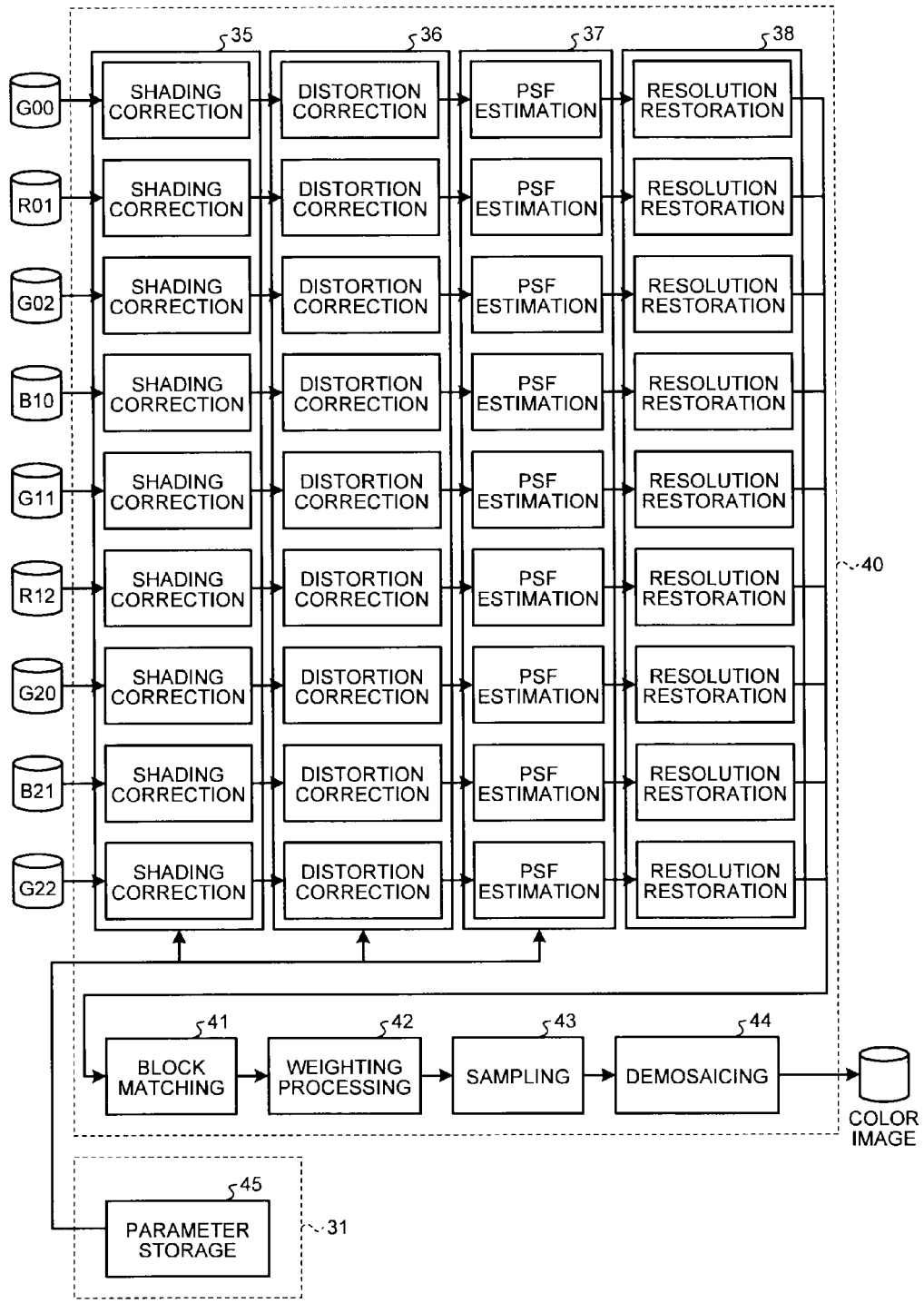
FIG. 10 is a block diagram of a modification of the configuration for the signal processing in the camera module.

FIG. 10 is a block diagram of a modification of the configuration for the signal processing in the camera module 30. In this modification, the camera module 30 carries out the signal processing from the shading correction to the demosaicing processing in the DSP 40. The DSP 40 includes the shading correcting unit 35, the distortion correcting unit 36, the lens-characteristic estimating unit 37, the resolution restoring unit 38, the block matching unit 41, the weighting processing unit 42, the sampling unit 43, and the demosaicing unit 44. The image sensor unit 31 includes a parameter storing unit 45. Parameters necessary for the processing in the DSP 40 are written in the parameter storing unit 45. The parameter storing unit 45 stores the written parameters. The image sensor unit 31 stores individual information of the camera module 30 in the parameter storing unit 45 as parameters.

The shading correcting unit 35 carries out the shading correction for a subject image referring to the parameters stored in the parameter storing unit 45. The distortion correcting unit 36 corrects distortion of the subject image referring to the parameters stored in the parameter storing unit 45. The lens-characteristic estimating unit 37 estimates the lens characteristics of the imaging lenses 34 of the sub-camera modules referring to the parameters stored in the parameter storing unit 45.

In the case of this modification, as in the embodiment, the camera module 30 can realize a reduction in thickness and a reduction in size and the photographing at high sensitivity. In general, in the DSP 40, limitation on a circuit size is often small compared with the image sensor unit 31. Therefore, the camera module 30 is configured to carry out the RAW image processing and the RGB synchronization (demosaicing) processing in the DSP 40. This makes it possible to obtain a high-quality image by performing complicated and advanced signal processing. Further, in the case of this modification, in the camera module 30, the circuit size of the image sensor unit 31 can be reduced. In the case of this modification, as in the embodiment, a coordinate conversion processing unit (not shown in the figure) that reduces a parallax amount (a movement amount) by performing coordinate conversion processing employing a matrix such as Affine transform can be applied instead of the weighting processing unit 42.

The camera module 30 can carry out, with the image sensor unit 31, the signal processing from the shading correction to the demosaicing processing. In this case, the image sensor unit 31 includes the shading correcting unit 35, the distortion correcting unit 36, the lens-characteristic estimating unit 37, the resolution restoring unit 38, the block matching unit 41, the weighting processing unit 42, the sampling unit 43, and the demosaicing unit 44 (not shown in the figure). The camera module 30 is configured to carry out the RAW image processing and the RGB synchronization (demosaicing) processing in the image sensor unit 31. This makes it possible to increase speed of the signal processing with a simple circuit configuration. In this case, as in the embodiment, a coordinate conversion processing unit (not shown in the figure) that reduces a parallax amount (a movement amount) by performing coordinate conversion processing employing a matrix such as Affine transform can be applied instead of the weighting processing unit 42. The DSP 40 is not always provided on the inside of the camera module 30 and can be provided on the outside of the camera module 30.

While certain embodiments have been described, these embodiments have been presented by way of example only, and are not intended to limit the scope of the inventions. Indeed, the novel devices and modules described herein may be embodied in a variety of other forms; furthermore, various omissions, substitutions and changes in the form of the devices and modules described herein may be made without departing from the spirit of the inventions. The accompanying claims and their equivalents are intended to cover such forms or modifications as would fall within the scope and spirit of the inventions.

What is claimed is:

1. An image processing device comprising:
a shading correcting unit that carries out shading correction for subject images picked up by imaging elements;
a distortion correcting unit that corrects distortion of the subject images;
a lens-characteristic estimating unit that estimates lens characteristics of imaging lenses that capture light made incident on the imaging elements;
a resolution restoring unit that carries out, based on the estimated lens characteristics, resolution restoration processing for the subject images;
a block matching unit that carries out block matching processing for alignment of the subject images; and
a demosaicing unit that generates a color image by performing demosaicing processing for image data obtained by the block matching processing, wherein
the shading correcting unit, the distortion correcting unit, the lens-characteristic estimating unit, and the resolution restoring unit carry out, on a plurality of sub-camera modules including the imaging elements and the imaging lenses, signal processing for each of image data obtained by the sub-camera modules.

2. The image processing device according to claim 1, wherein
one of the sub-camera modules is set as a reference sub-camera module, and
the shading correcting unit, the distortion correcting unit, the lens-characteristic estimating unit, and the resolution restoring unit carry out the signal processing on the image data obtained by shifting focusing positions of the subject images by the sub-camera modules other than the reference sub-camera module with respect to a focusing position of the subject image by the reference sub-camera module.

3. The image processing device according to claim 2, wherein the reference sub-camera module is a sub-camera module for green that picks up a green component of the subject image.

4. The image processing device according to claim 1, wherein
one of the sub-camera modules is set as a reference sub-camera module, and
the resolution restoring unit carries out the resolution restoration processing based on the lens characteristics added with position information for shifting the subject images picked up by the sub-camera modules other than the reference sub-camera module with respect to the subject image picked up by the reference sub-camera module.

5. The image processing device according to claim 1, wherein
one of the sub-camera modules is set as a reference sub-camera module, and
the image processing device further comprises a sampling unit that carries out, with the subject image picked up by the reference sub-camera module set as a reference, sampling of a signal value concerning an image, parallax of which due to the sub-camera modules other than the reference sub-camera module is corrected.

6. The image processing device according to claim 5, further comprising a weighting processing unit that calculates a parallax amount of the subject images obtained by the sub-camera modules and carries out weighting processing corresponding to the parallax amount, wherein
the sampling unit carries out the sampling based on an image generated by the weighting processing unit.

7. The image processing device according to claim 5, further comprising a coordinate conversion processing unit that carries out coordinate conversion processing for reducing a parallax amount of the subject images obtained by the sub-camera modules, wherein
the sampling unit carries out the sampling based on an image generated by the coordinate conversion processing unit.

8. The image processing device according to claim 1, wherein the block matching unit carries out the block matching processing for obtaining a predetermined total number of pixels.

9. The image processing device according to claim 1, wherein the demosaicing unit carries out up-sampling for obtaining a predetermined total number of pixels.

10. A solid-state imaging device comprising a plurality of imaging elements that pick up subject images, wherein
one of a plurality of sub-camera modules including the imaging elements and imaging lenses, which capture light made incident on the imaging elements, is set as a reference sub-camera module,
the imaging elements of the sub-camera modules other than the reference sub-camera module are arranged with focusing positions of the subject images shifted with respect to the imaging element of the reference sub-camera module,
a shading correcting unit that carries out shading correction for the subject images;
a distortion correcting unit that corrects distortion of the subject images;
a lens-characteristic estimating unit that estimates lens characteristics of the imaging lenses that capture light made incident on the imaging elements; and
a resolution restoring unit that carries out, based on the estimated lens characteristics, resolution restoration processing for the subject images, wherein the shading correcting unit, the distortion correcting unit, the lens-characteristic estimating unit, and the resolution restoring unit carry out signal processing for each of image data obtained by the sub-camera modules.

11. The solid-state imaging device according to claim 10, wherein the imaging element of the reference sub-camera module is arranged in a center of the imaging elements.

12. The solid-state imaging device according to claim 10, further comprising: a block matching unit that carries out, on image data subjected to the processing by the shading correcting unit, the distortion correcting unit, the lens-characteristic estimating unit, and the resolution restoring unit, block matching processing for alignment of the subject images; and a demosaicing unit that generates a color image by performing demosaicing processing for an image obtained by the block matching processing.

13. A camera module comprising:
a plurality of imaging elements that pick up subject images;
a plurality of imaging lenses that capture light made incident on the imaging elements;
a housing that houses the imaging elements and the imaging lenses;
a shading correcting unit that carries out shading correction for the subject images;
a distortion correcting unit that corrects distortion of the subject images;
a lens-characteristic estimating unit that estimates lens characteristics of the imaging lenses;
a resolution restoring unit that carries out, based on the estimated lens characteristics, resolution restoration processing for the subject images;
a block matching unit that carries out block matching processing for alignment of the subject images; and
a demosaicing unit that generates a color image by performing demosaicing processing for an image obtained by the block matching processing, wherein
the shading correcting unit, the distortion correcting unit, the lens-characteristic estimating unit, and the resolution restoring unit carry out, on a plurality of sub-camera modules including the imaging elements and the imaging lenses, signal processing for each of image data obtained by the sub-camera modules.

14. The camera module according to claim 13, wherein
one of the sub-camera modules is set as a reference sub-camera module, and
the imaging elements of the sub-camera modules other than the reference sub-camera module are arranged with focusing positions of the subject images shifted with respect to the imaging element of the reference sub-camera module.

15. The camera module according to claim 13, wherein
one of the sub-camera modules is set as a reference sub-camera module, and
the resolution restoring unit carries out the resolution restoration processing based on the lens characteristics added with position information for shifting the subject images picked up by the sub-camera modules other than the reference sub-camera module with respect to the subject image picked up by the reference sub-camera module.

16. The camera module according to claim 13, wherein
one of the sub-camera modules is set as a reference sub-camera module, and
the camera module further comprises a sampling unit that carries out, with the subject image picked up by the reference sub-camera module set as a reference, sampling of a signal value concerning an image, parallax of which due to the sub-camera modules other than the reference sub-camera module is corrected.

17. The camera module according to claim 16, further comprising a weighting processing unit that calculates a parallax amount of the subject images obtained by the sub-camera modules and carries out weighting processing corresponding to the parallax amount, wherein
the sampling unit carries out the sampling based on an image generated by the weighting processing unit.

18. The camera module according to claim 16, further comprising a coordinate conversion processing unit that carries out coordinate conversion processing for reducing a parallax amount of the subject images obtained by the sub-camera modules, wherein
the sampling unit carries out the sampling based on an image generated by the coordinate conversion processing unit.

19. The camera module according to claim 13, further comprising a parameter storing unit that stores individual information of the camera module as parameters, wherein
at least one of the shading correcting unit, the distortion correcting unit, and the lens-characteristic estimating unit refers to the parameters stored in the parameter storing unit.

* * * * *